United States Patent [19]
Carrara et al.

[11] Patent Number: 5,898,399
[45] Date of Patent: Apr. 27, 1999

[54] SUBCHIRP PROCESSING METHOD

[75] Inventors: Walter G. Carrara, Ann Arbor; Ron S. Goodman, Novi, both of Mich.

[73] Assignee: ERIM International, Inc., Ann Arbor, Mich.

[21] Appl. No.: 08/644,329

[22] Filed: May 10, 1996

[51] Int. Cl.$^6$ .................................................. G01S 13/90
[52] U.S. Cl. .................................................. 342/25
[58] Field of Search .......................... 342/25, 195, 196, 342/179

[56] References Cited

U.S. PATENT DOCUMENTS

| | | | |
|---|---|---|---|
| 4,134,113 | 1/1979 | Powell | 342/25 |
| 5,191,344 | 3/1993 | Moreira | 342/25 |

*Primary Examiner*—Daniel T. Pihulic
*Attorney, Agent, or Firm*—Gifford, Krass, Groh, Sprinkle, Patmore, Anderson & Citkowski

[57] ABSTRACT

A method of performing the computer-intensive initial steps of the range migration algorithm, or RMA, produces radar imagery of higher quality than the current polar format (PF) processing approach, while operating faster and more efficiently than the standard RMA. The new method is advantageous when the synthetic aperture length required to achieve azimuth resolution is significantly larger than the azimuth extent of the processed scene. The method subdivides the signal history into a plurality of non-overlapping subapertures, adds a low bandwidth azimuth chirp across each subaperture and applies a fast Fourier transform separately to each subaperture. The results are coherently combined, after which the remaining steps of the conventional RMA may be completed with minor modifications to the subsequent two-dimensional phase compensation. The invention is applicable to spotlight, stripmap and scan-mode SAR image formation, and the separate, subaperture Fourier transformations may be performed simultaneously.

12 Claims, 5 Drawing Sheets

SUBCHIRP PROCESSING METHOD

FIELD OF THE INVENTION

The present invention relates generally to radar imaging and, more particularly, to a method of performing the initial azimuth FFT in a synthetic aperture radar system utilizing the range migration technique for image formation.

BACKGROUND OF THE INVENTION

Synthetic aperture radar, or SAR, has become an invaluable remote-sensing tool. To achieve the finest resolution, focused SAR is used, wherein some process is used to modify received signal histories to mitigate the detrimental effects of scatterer motion through range and doppler resolution cells. One approach to focussed SAR involves the use of polar format (PF) processing[1]. An alternative approach is based upon the range migration algorithm, or RMA, also known as the Ω-K algorithm and wave number processing. Both the PF and RMA techniques have their advantages and disadvantages[2]. PF is typically less computationally intensive and more memory efficient, but systems based on the RMA are capable of producing well-focused, fine-resolution images over a wider area scene.

[1] Walker, J. L., "Range-Doppler Imaging of Rotating Objects," *IEEE Transactions on Aerospace and Electronic Systems*, Vol. AES-16, No. 1, January 1980, pp. 23–52.

[2] Cafforio, C., C. Prati, and F. Rocca, "SAR Data Focusing Using Seismic Migration Techniques," *IEEE Transactions on Aerospace and Electronic Systems*, Vol. 27, No. 2, March 1991, pp. 194–206.

More specific advantages of the RMA over conventional PF processing include the following:

1. The RMA provides an exact solution to the problem of range curvature. Fine-resolution, large scene images produced using the RMA do not suffer the geometric (keystone) distortion or residual quadratic phase errors inherent in conventional PF processing;

2. The RMA can produce large scene size images free of subpatch and subswath boundaries. Such images are better suited for coherent-based image enhancement and exploitation techniques; and 3. The RMA is directly capable of processing spotlight, stripmap, and scan-mode SAR images. These advantages become increasingly significant with improvements in SAR system resolution and area coverage. The RMA is particularly useful in fine-resolution SAR systems operating at low frequencies, typically in systems designed for foliage penetration (FOPEN) and ground penetration (GPEN) applications.

SUMMARY OF THE INVENTION

The present invention resides in a fast computational method of performing the computer-intensive initial steps of the range migration algorithm, or RMA. This subchirp processing method thus provides a computationally and memory efficient digital processing technique capable of producing SAR imagery of higher quality than the current polar format (PF) processing approach, while operating faster and more efficiently than the standard RMA. More specifically, in a SAR image processing system utilizing the RMA, the invention provides a method of performing the initial azimuth FFT portion of the RMA by subdividing the azimuth-chirped signal history into a plurality of non-overlapping subapertures. An FFT is then separately applied to each subaperture and the results are coherently combined, after which the remaining steps of the conventional RMA may be completed. The invention is applicable to spotlight, stripmap and scan-mode SAR image formation, and the separate, subaperture Fourier transformations may be performed simultaneously in a parallel or distributed processing architecture.

A more comprehensive summary of the method, including steps otherwise performed as part of the RMA, includes receiving signal history data and motion compensating the signal history data to a fixed scene point. The signal history is then subdivided into a plurality of non-overlapping subapertures, and a Fourier transformation is carried out on each subaperture separately. The results of the separate Fourier transformations are shifted and coherently summed to produce full-bandwidth transform data, which is then range-dimension resampled and inverse Fourier transformed in two dimensions to yield an output image. A key advantage of the invention is that the full-bandwidth transform data contains fewer azimuthal samples then conventional RMA procedures, thereby realizing a significant savings in computational and memory requirements.

DETAILED DESCRIPTION OF THE PREFERRED EMBODIMENT

Figure 1:
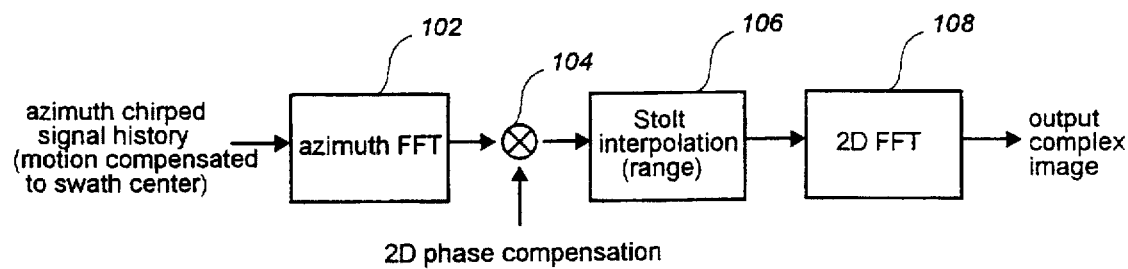
FIG. 1 is a block diagram used to illustrate procedural steps associated with the range migration algorithm.

A simplified model of the RMA is provided in FIG. 1. At functional block 102, an azimuth fast Fourier transform (FFT) is performed on motion-compensated (to swath center), azimuth-chirped signal data. Two-dimensional phase compensation is then carried out at step 104. A one-dimensional range-dimension resampling, known as Stolt interpolation, is performed at block 106, followed by a two-dimensional inverse FFT at 108 to output a complex image.

Figure 2:
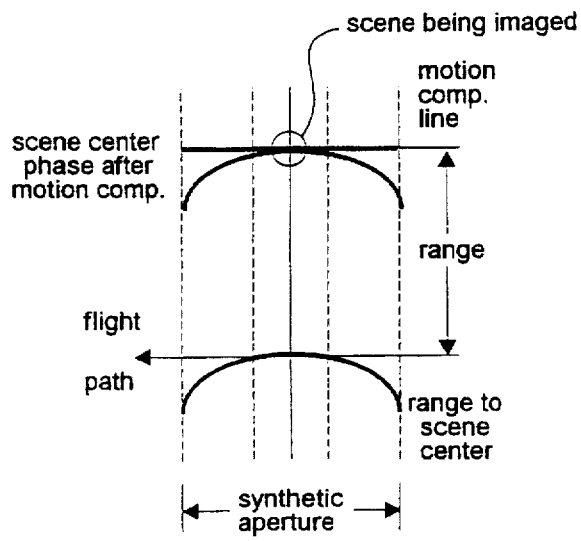
FIG. 2 is a diagram relating to strip map motion compensation.
Figure 3:
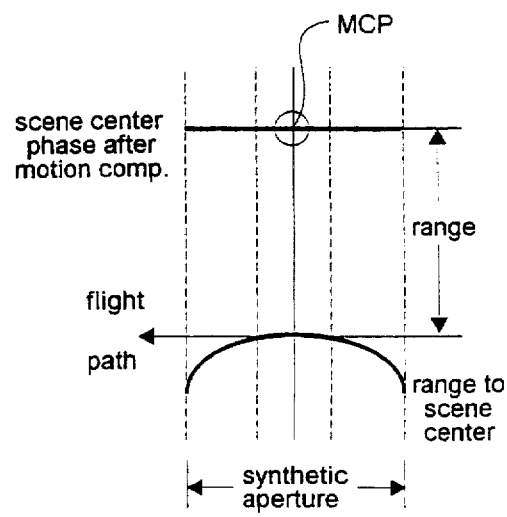
FIG. 3 is a diagram relating to spotlight motion compensation.

A significant disadvantage of the RMA is that it must operate on the azimuth-chirped signal data directly, necessitating high along-track sampling rates at the front-end of the RMA processor. That is, the RMA operates on signal history data which has been motion compensated to a sliding point, (i.e., compensated to a line as in strip map mode as shown in FIG. 2) rather than to a fixed scene point (as in FIG. 3), which is generally performed in conjunction with spotlight processing algorithms. SAR signal data compensated in this manner has much higher total Doppler bandwidth due to the presence of a large instantaneous Doppler offset (carrier) frequency.

The standard spotlight PF procedure partially removes this azimuth offset frequency through adjustment of receiver range gates and starting phase from pulse-to-pulse (motion compensation) during data collection, permitting lower pulse repetition frequency (PRF) operation than would otherwise be required. However, the RMA procedure dictates a reinstatement of the full Doppler carrier (azimuth chirp) after data collection and transmission but prior to the azimuth FFT step of the algorithm which, in turn, requires that the signal history first be upsampled in azimuth relative to the collection PRF. For some imaging geometries (in particular, squinted, fine resolution spotlight mode), the required unsampling may be 10:1 or higher. This large unsampling of recorded signal history data often represents an unacceptable computational burden and memory inefficiency.

Figures 4, 6:
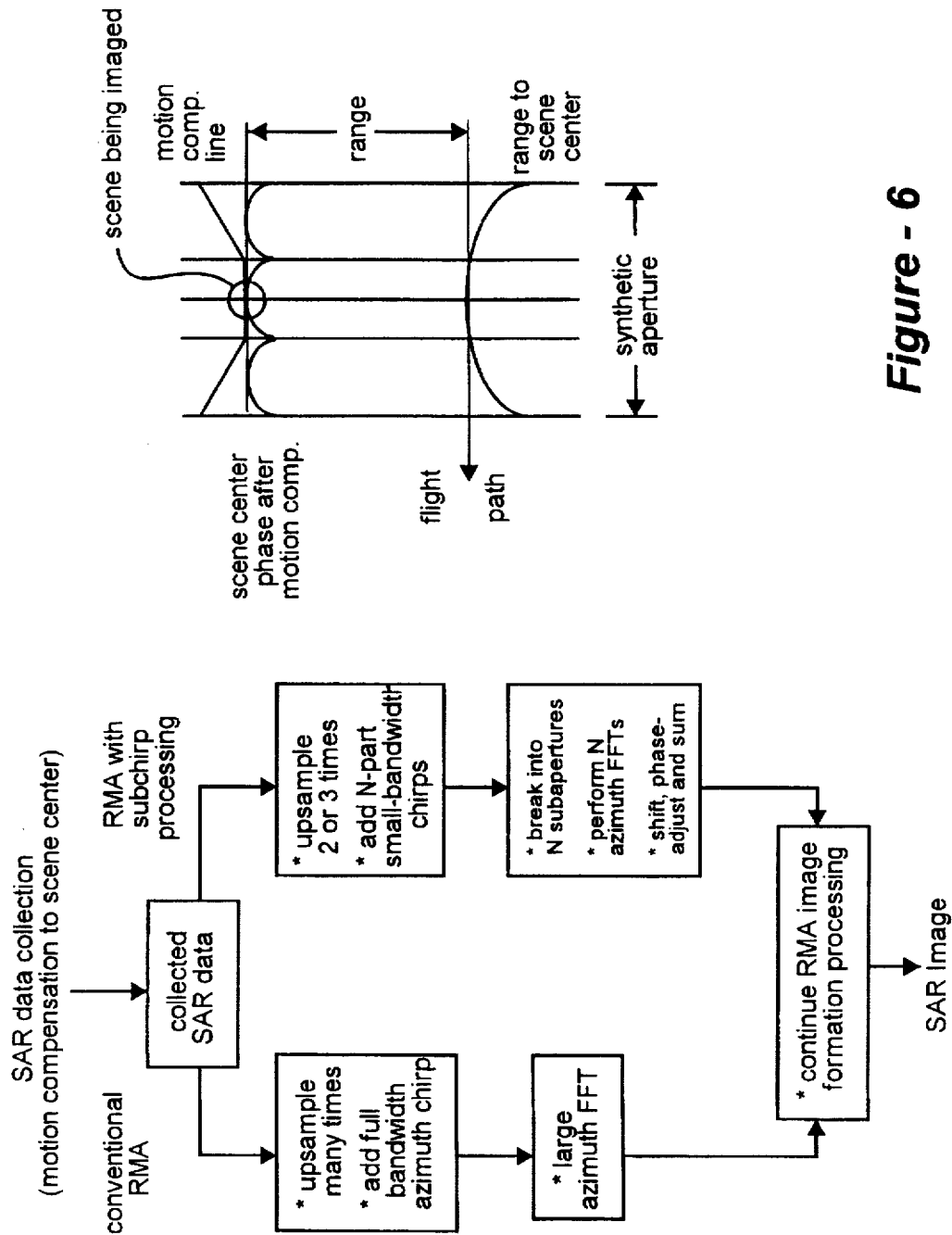
FIG. 4 is a block diagram providing a comparison between a conventional range migration algorithm (RMA), and the RMA incorporating subchirp processing according to this invention.
FIG. 6 is a diagram used to illustrate motion compensation requirements for the subchirp processing method.

This invention replaces the first along-track FFT of the RMA with other operations which facilitate effective computation of the transform at a much lower sampling rate. Put another way, the method may be viewed as a substitute for the first azimuth FFT of the RMA with minor adjustments to the succeeding RMA steps. FIG. 4 illustrates this substitution. In each case, processing begins with the collected complex phase history data with motion compensation to scene center. The usual RMA process (on the left) must immediately upsample the data by a large factor, add the full bandwidth azimuth chirp modulation associated with the data collection geometry, and calculate an azimuth FFT over the upsampled data. The subchirp process (on the right) breaks the azimuth aperture into a number of shorter subapertures and adds a low bandwidth chirp across each subaperture. While the subchirp process must upsample an optimally-sampled signal history by a small factor, the resulting sample rate is often below the data collection PRF (pulse repetition frequency). Subchirp processing does not reduce or affect the required transmit PRF.

The invention exploits the fact that the instantaneous bandwidth of an azimuth scene is much lower than total Doppler bandwidth required to achieve desired azimuth resolution. This principle is analogous to the SAR range dimension in systems using dechirp-on-receive, where the intermediate frequency (IF) bandwidth due to the range swath is much lower than transmitted RF bandwidth, permitting reduced analog-to-digital sampling rates. The method is applicable to all existing SAR imaging modes.

Figure 5:
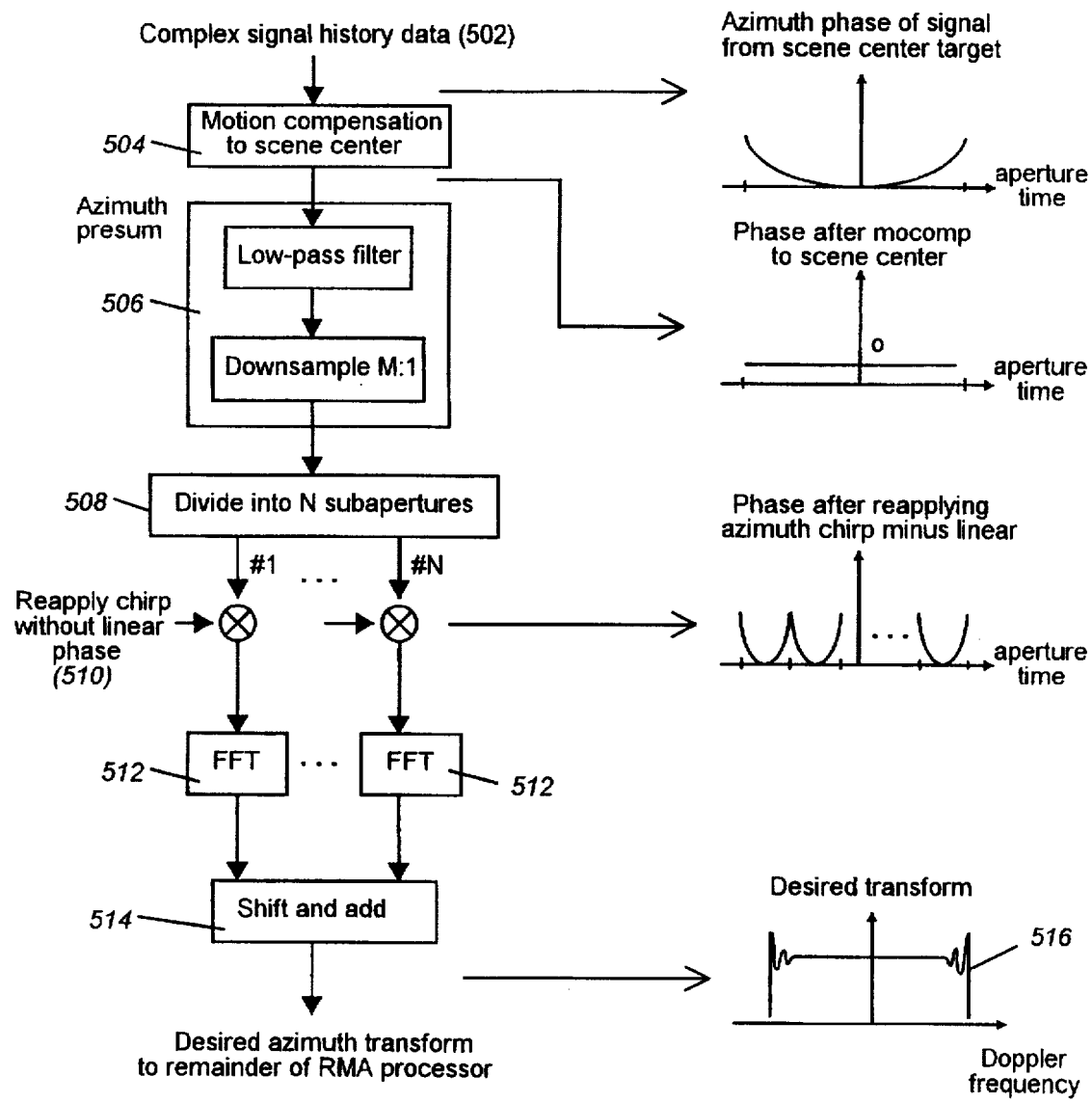
FIG. 5 presents a procedural block diagram and associated drawings which illustrate the subchirp processing method.

The subchirp processing procedure is depicted in FIG. 5. The complex SAR signal history data 502 are first motion compensated at block 504 with respect to a fixed scene point (the standard spotlight-mode procedure), allowing a presum at 506 to a reduced sampling rate commensurate with the azimuth scene size of a processed image. The method then breaks the signal history aperture into a number of non-overlapping subapertures at step 508, depending on system parameters and collection geometry. The azimuth chirp (which was removed by motion compensation to a fixed point) is then reapplied at 510 in a modified form. The linear phase component of the chirp over each subaperture is not applied, as it is this large linear phase which creates the need for increased sampling rates. The effective motion compensation line is thus a linear segment approximation to a quadratic, as seen in FIG. 6.

Referring back to FIG. 5, each subaperture is Fourier transformed separately at block 512, then the results are shifted and coherently summed at 514 with appropriate phase adjustments to obtain the desired, full bandwidth transform 516. At this point, RMA processing can proceed as depicted in FIG. 1, typically with some minor adjustments to the two-dimensional matched filter as applied. The final image is then formed via a two-dimensional inverse FFT.

In one experiment, signal history data from three point targets was simulated based on a linear FM SAR system utilizing dechirp-on-receive. The following table lists important simulation parameters used for this experiment:

TABLE 1

Simulation Parameters

| Parameter | Value |
|---|---|
| Sensor Velocity | 135 m/sec |
| PRF | 225 Hz |
| Start Frequency | 200 MHz |
| Pulse Width | 13.65 μsec |
| Chirp Rate | 11.0 MHz/μsec |
| Samples per Pulse | 1024 |
| Number of Pulses | 2048 |
| Antenna Beamwidth | 32.0 deg |
| Scene Size | 600 × 600 m |

Figure 7:
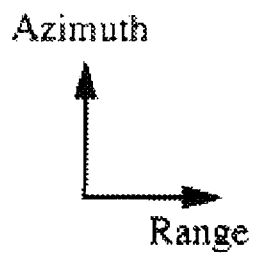
FIG. 7(a) is a simulated point target image formed via conventional range migration processing.
FIG. 7(b) shows the simulated point target image of FIG. 7(a) formed through subchirp processing.
Figure 7:
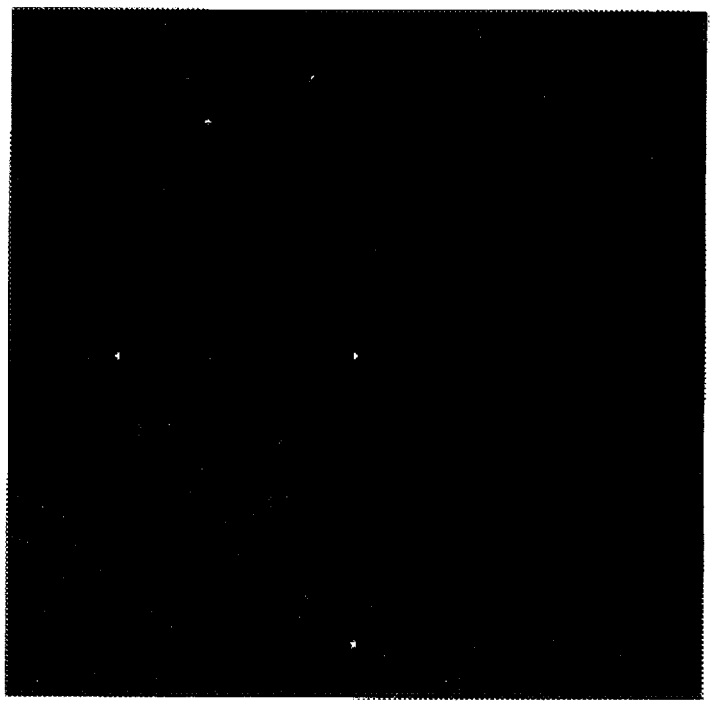
Figure 7:
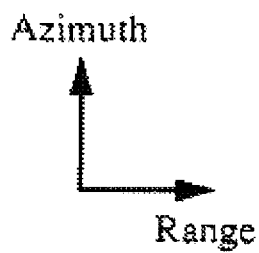
Figure 7:
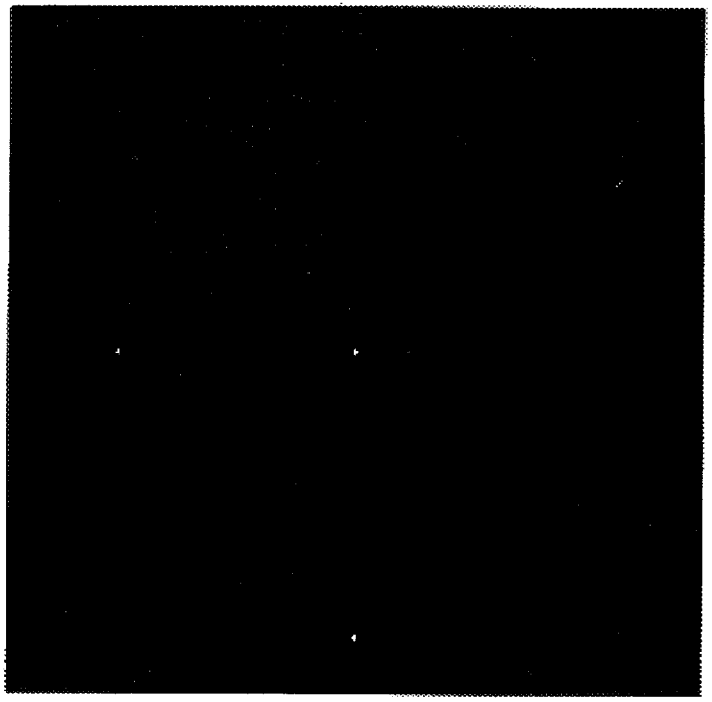

As this experiment was concerned with ultra-wideband radar imaging, signal history data was simulated with a VHF-band transmitter start frequency. However, the underlying principles and implementation of the subchirp processing method are independent of radar frequency, and the invention is equally applicable to higher frequency systems, including X-band. FIG. 7(a) shows the simulated point target array after standard RMA processing. A 2048-point FFT was required to produce the image. FIG. 7(b) shows the same image processed using subchirp processing. The invention yields the same image, but with only four 256-point FFT's, which represents a substantial computational savings over standard RMA processing. Additionally, the final azimuth inverse FFT was reduced to only 1280 samples by use of the procedure.

Figure 8:
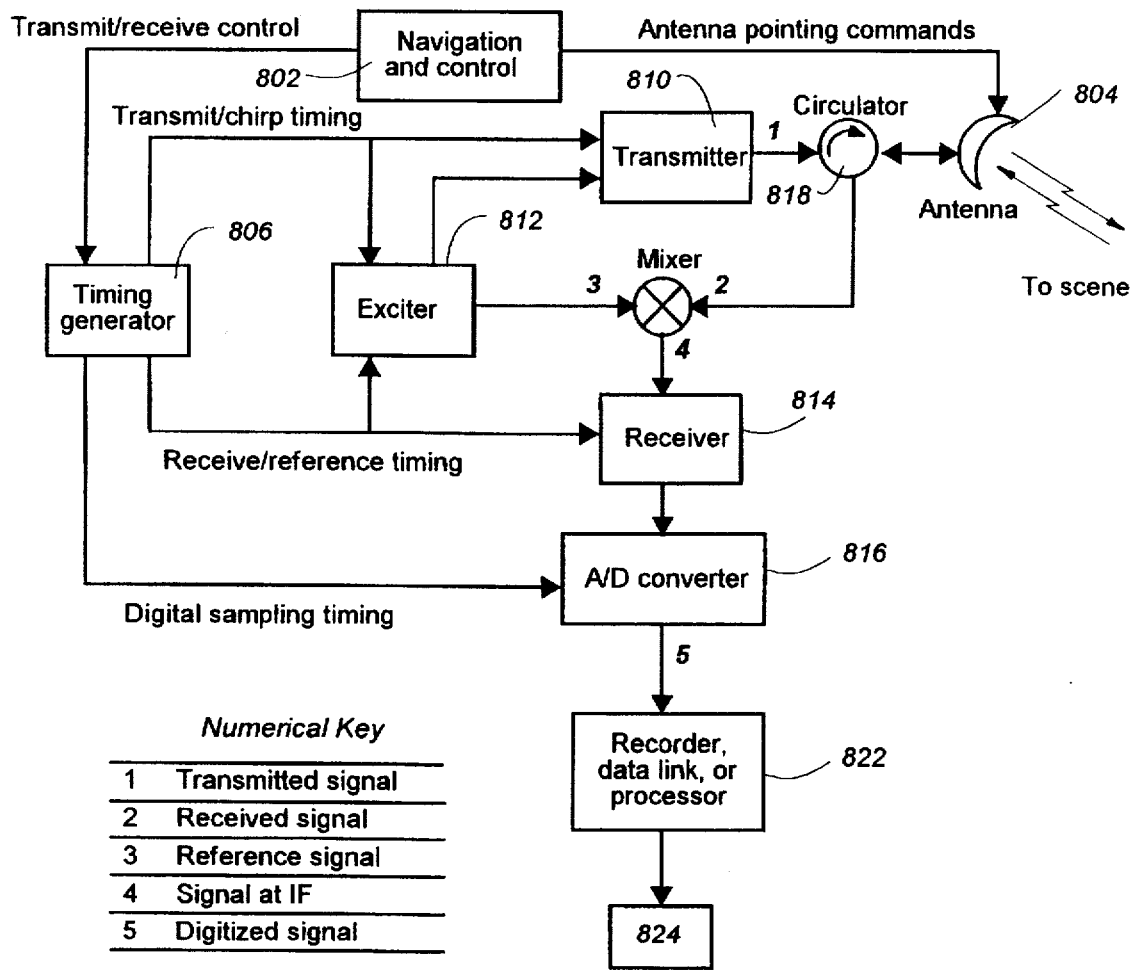
FIG. 8 depicts the basic components in a synthetic aperture radar (SAR) sensor of the type used to provide data as input to the method of the present invention.

FIG. 8 depicts basic components in a SAR system responsible for the generation, collection and initial processing of received signals for archiving, display, or other purposes. This figure is taken from "Spotlight Synthetic Aperture Radar: Signal Processing Algorithms," W. Carrara, R. Goodman, R. Majowski, Artech House, Boston, MASS. FIG. 2.3 and Table 2.1 in particular. A navigation and control block 802 provides antenna pointing commands to an antenna 804 and transmit/receive control signals to a timing generator 806, which, in turn, provides transmit/chirp timing to a transmitter 810 and an exciter 812. The timing generator 806 also provides receive and reference timing signals both to the exciter 812 and to a receiver 814 as well as digital sampling to an analog-to-digital (A/D) converter 816.

The circulator 818 and mixer 820 coordinate transmit and receive operations. The output of the A/D converter 816 is available for a variety of purposes at block 822, including temporary storage via data recorder, communication to a remote processing center via data link or direct processing o facilitate, for example, an image display at block 824. The method of the invention operates upon the digitized output signal provided by the A/D converter 816 to perform the computer-intensive initial steps of the range migration algorithm, or RMA.

Having thus described our invention, we claim:

1. The method of forming a synthetic aperture radar (SAR) image, comprising the steps of:

receiving SAR signal history data;

motion compensating the signal history data to a fixed scene point;

subdividing the signal history data into a plurality of non-overlapping subapertures;

adding a low-bandwidth chirp in azimuth to each subaperture;

Fourier transforming each subaperture separately;

shifting and coherently summing the results of the separate Fourier transformations to yield full-bandwidth transform data;

resampling the full-bandwidth transform data in the range dimension; and performing a two-dimensional inverse Fourier transformation on the resampled data to generate a complex image.

2. The method of claim 1, wherein the steps are performed to generate a spotlight-type SAR image.

3. The method of claim 1, wherein the steps are performed to generate a stripmap-type SAR image.

4. The method of claim 1, wherein the steps are performed to generate a scan-mode SAR image.

5. The method of claim 1, including the use of fast Fourier transformations.

6. The method of claim 1, wherein the separate subaperture Fourier transformations are performed simultaneously.

7. In a SAR image processing system utilizing a range migration algorithm (RMA), the method of performing the azimuth FFT of the RMA, comprising the steps of:

receiving an azimuth-chirped signal history;

subdividing the signal history into a plurality of non-overlapping subapertures;

adding a low-bandwidth chirp in azimuth to each subaperture;

applying an FFT to each subaperture;

coherently adding the results of the FFTs; and completing the RMA.

8. The method of claim 7, wherein the steps are performed to generate a spotlight-type SAR image.

9. The method of claim 7, wherein the steps are performed to generate a stripmap-type SAR image.

10. The method of claim 7, wherein the steps are performed to generate a scan-mode SAR image.

11. The method of claim 7, wherein the separate subaperture Fourier transformations are performed simultaneously.

12. In a range migration algorithm (RMA) of the type used to generate SAR imagery, the improvement comprising the replacement of the first along-track FFT of the RMA with the following steps:

subdividing the signal history into a plurality of non-overlapping subapertures;

adding a low-bandwidth chirp in azimuth to each subaperture;

applying an FFT to each subaperture; and coherently adding the results of the FFTs to obtain full transform data.

* * * * *